United States Patent
Wu

(10) Patent No.: US 7,382,750 B2
(45) Date of Patent: Jun. 3, 2008

(54) INTER-RAT HANDOVER TO UTRAN WITH SIMULTANEOUS PS AND CS DOMAIN SEVICES

(75) Inventor: Chih-Hsiang Wu, Hsin-Tien (TW)

(73) Assignee: High Tech Computer Corp., Taoyuan, Taoyuan County (TW)

( * ) Notice: Subject to any disclaimer, the term of this patent is extended or adjusted under 35 U.S.C. 154(b) by 952 days.

(21) Appl. No.: 10/610,791

(22) Filed: Jul. 2, 2003

(65) Prior Publication Data
US 2005/0003819 A1    Jan. 6, 2005

(51) Int. Cl.
*H04L 12/66*    (2006.01)
(52) U.S. Cl. .................. 370/331; 370/352; 370/353; 370/354
(58) Field of Classification Search ............. 455/436, 455/439, 435.1, 433; 370/331, 332, 352, 370/328, 353, 354
See application file for complete search history.

(56) References Cited

U.S. PATENT DOCUMENTS

| 6,549,779 | B1 | 4/2003 | Muller et al. | |
| 6,643,513 | B2* | 11/2003 | Timonen et al. | 455/438 |
| 7,123,910 | B2* | 10/2006 | Lucidarme et al. | 455/434 |
| 2003/0114158 | A1* | 6/2003 | Soderbacka et al. | 455/436 |
| 2003/0169725 | A1* | 9/2003 | Ahmavaara et al. | 370/352 |
| 2004/0240430 | A1* | 12/2004 | Lin et al. | 370/352 |
| 2005/0239461 | A1* | 10/2005 | Verma et al. | 455/435.1 |

FOREIGN PATENT DOCUMENTS

| WO | WO 01/89251 A1 | 11/2001 |
| WO | WO 03/037022 A2 | 5/2003 |
| WO | WO 03/037022 A3 | 5/2003 |

* cited by examiner

*Primary Examiner*—George Eng
*Assistant Examiner*—Brandon J Miller
(74) *Attorney, Agent, or Firm*—Winston Hsu

(57) ABSTRACT

A wireless device initially has simultaneous circuit switched (CS) and packet switched (PS) services with a non-UMTS network. With the CS and PS services ongoing, the non-UMTS network transmits a HANDOVER TO UTRAN COMMAND message to the wireless device to perform a handover to UTRAN procedure. The HANDOVER TO UTRAN COMMAND message excludes information used for handing over the PS signaling connections to the UTRAN so that only CS signaling connections are handed over. The wireless device receives and parses the HANDOVER TO UTRAN COMMAND message to determine what signaling connections are being handed over. Upon determining that only CS signaling connections are being handed over, a radio resource control (RRC) layer within the wireless device informs an upper layer within the wireless device that no PS radio access bearers or no PS signaling connections are present.

24 Claims, 8 Drawing Sheets

INTER-RAT HANDOVER TO UTRAN WITH SIMULTANEOUS PS AND CS DOMAIN SEVICES

BACKGROUND OF INVENTION

1. Field of the Invention

The present invention relates to cellular networks. More specifically, a method for performing an Inter-RAT handover is disclosed.

2. Description of the Prior Art

Inter system handovers between Global System for Mobile Communications (GSM) and Universal Terrestrial Radio Access Network (UTRAN) are expected to play an increasingly important role, as many $3^{rd}$ Generation (3G) operators will provide wide-area coverage with the GSM Base Station System (BSS) and use the 3G UTRAN in relatively small traffic hotspots. A dual-system user equipment (UE) is capable of supporting both GSM and UTRAN systems. Each time such a UE moves between the two types of coverage areas, an inter system handover must be performed. Because the 3GPP specifications make wide use of the term "radio access technology (RAT)" when referring to application network technologies, the inter system handover is often called an inter-RAT handover. An inter-RAT handover to UTRAN procedure hands the UE over from a GSM system to a UTRAN system. Similarly, an inter-RAT handover from UTAN procedure hands the UE over from the UTRAN system to a GSM system.

To perform an inter-RAT handover to UTRAN, a large amount of information, such as spreading, channelization codes and frequency information, must be provided to the UE. Relaying so much information to the UE using an extended (and possibly segmented) GSM handover command would be impractical. In particular, segmentation over more than two GSM air interface messages would have an unacceptable impact on handover performance. Consequently, the use of predefined and default Universal Mobile Telecommunications System (UMTS) radio configurations was proposed. This is discussed in detail in the specifications 3GPP 25.331 "Radio Resource Control (RRC) Protocol Specification", and 3GPP TS 25.922 "Radio Resource Management Strategies", both of which are included herein by reference. Attention is drawn in particular to clause 5.1.5.2 of 3GPP TS 25.922, which deals with the use of predefined radio configuration during handover from 2G (i.e., GSM) to 3G (i.e., UTRAN). In short, by utilizing default configurations stored in every UE, and up to sixteen predefined configurations that are downloadable from the UTRAN, it is possible to greatly reduce the total amount of information that needs to be sent to the UE to perform the inter-RAT handover to UTRAN procedure, and thus ensure that the handover performance is acceptable.

The UE can support both circuit switched (CS) and packet switched (PS) connections, and both types of connections must be handed over. The handover to UTRAN procedure is quite complex, and a complete description of every aspect of the procedure is quite beyond this background description. However, for more details, in addition to the above-noted specifications, attention is also drawn to 3GPP TS 23.060 "General Packet Radio Service (GPRS); Service description; Stage 2", and 3GPP TS 24.008 "Mobile radio interface layer 3 specification; Core Network Protocols; Stage 3", both of which are included herein by reference. Of particular note is clause 6.13.2.2 of 3GPP TS 23.060, which details aspects of the handover to UTRAN procedure for PS services; clause 4.7.1.7 of 3GPP TS 24.008, and, within 3GPP TS 25.331, clauses B.6.2, 8.3.6 and 10.2.16a.

Briefly, though, the above specifications indicate that both PS and CS services are to be handed over concurrently. As it turns out, though, the handover to UTRAN procedure can only utilize the default/predefined UMTS radio configurations for the CS connection, and consequently a great deal of information must be explicitly provided for the PS connection. As indicated above, this can lead to segmentation over more than two GSM air interface messages, which will adversely impact the handover performance. In addition, the above references do not provide a clear method for enabling the UE to determine whether or not a signaling connection exists after the handover to UTRAN procedure. This may cause the UE to subsequently use an incorrect procedure (initial direct transfer or uplink direct transfer) to transfer a message to the UTRAN.

SUMMARY OF INVENTION

It is therefore a primary objective of this invention to provide an inter system handover to Universal Terrestrial Radio Access Network (UTRAN) procedure that provides for the handing over of both circuit switched (CS) and packet switch (PS) services while keeping the information needed to perform the handover down to a minimum.

It is a further objective of this invention to provide the user equipment (UE) with the ability to determine what signaling connections are handed over during the handover to UTRAN procedure.

Briefly summarized, the preferred embodiment of the present invention discloses a wireless device initially having simultaneous circuit switched (CS) and packet switched (PS) services with a first radio access technology (RAT) system that is not a UMTS (for example, a GSM system). With the CS and PS services ongoing, the first RAT system transmits a HANDOVER TO UTRAN COMMAND message to the wireless device to perform a handover to UTRAN procedure. The HANDOVER TO UTRAN COMMAND message excludes information used for handing over the PS signaling connections to the UTRAN so that only CS signaling connections are handed over. The wireless device receives and parses the HANDOVER TO UTRAN COMMAND message to determine what signaling connections are being handed over. Upon determining that only CS signaling connections are being handed over, a radio resource control (RRC) layer within the wireless device informs an upper layer within the wireless device that no PS radio access bearers or no PS signaling connections are present.

It is an advantage of the present invention that by providing for the handing over of only the CS services, the amount of information needed to perform the handover procedure is reduced, and thus the handover procedure is more likely to be performed successfully. That is, excessive segmentation of the handover information is avoided. Consequently, CS services proceed smoothly around the handover procedure. PS services, which are better able to handle brief suspensions of service without inconvenience to the user, can be re-established later.

These and other objectives of the present invention will no doubt become obvious to those of ordinary skill in the art after reading the following detailed description of the preferred embodiment, which is illustrated in the various figures and drawings.

DETAILED DESCRIPTION

In the following, a GSM system serves as an example of a non-UMTS system with which a handover to UTRAN procedure is performed. The method of the present invention, however, is suitable for other types of non-UMTS systems that support the handover to UTRAN procedure. Adapting the present invention method to such other systems should be clear after reading the following detailed description that is made with specific reference to a GSM system.

Figure 1:
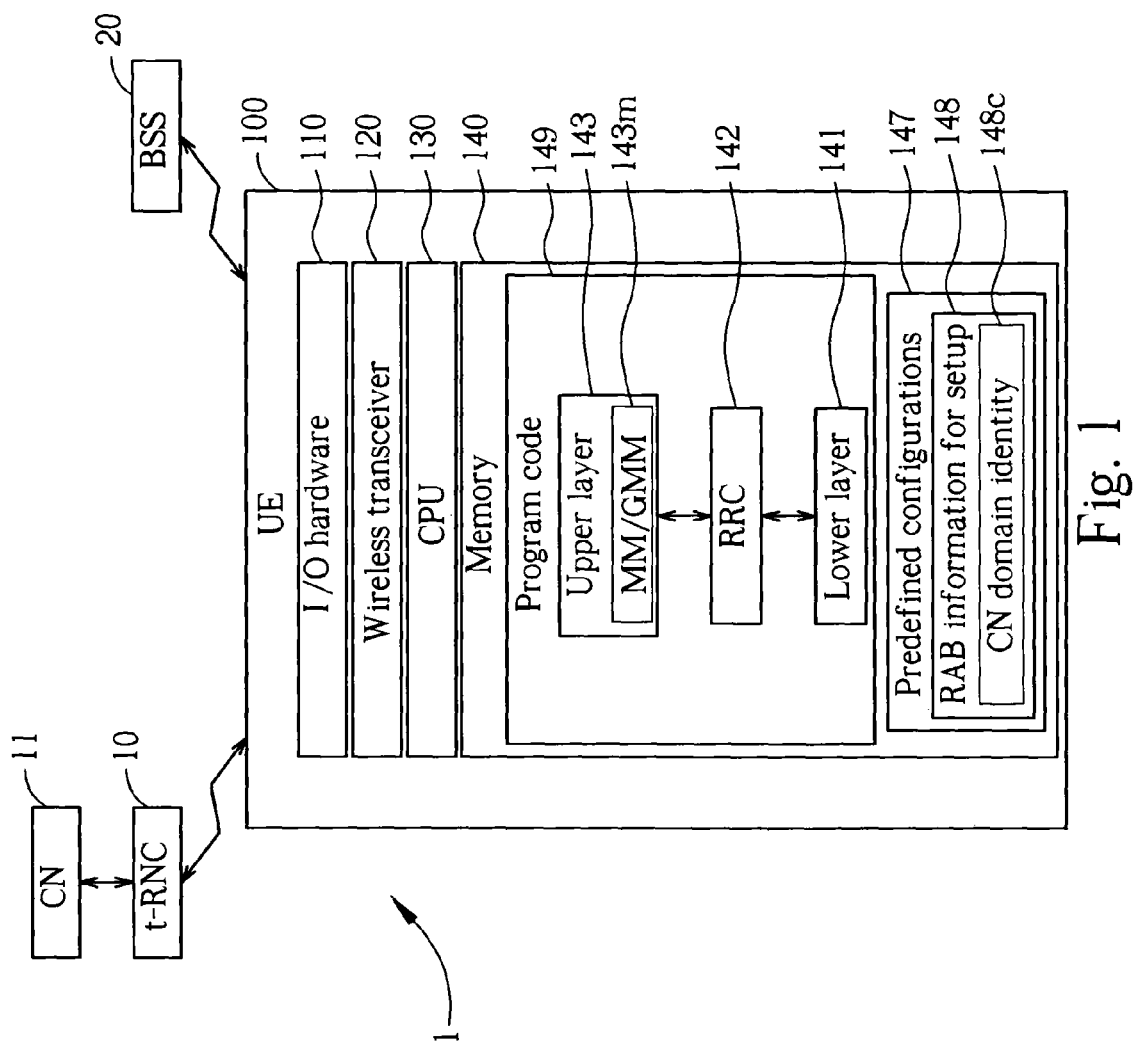
FIG. 1 is a simple block diagram of a wireless device according to a preferred embodiment of the present invention.

Please refer to FIG. 1. FIG. 1 is a simple block diagram of a wireless system 1 capable of performing the present invention method, and includes a wireless device 100 in communications with a UMTS target radio network controller (t-RNC) 10 and a GSM base station system (BSS) 20. The t-RNC 10 communicates with a core network (CN) 11, and the CN11 is capable of communicating with the BSS 20. The t-RNC 10 and the BSS 20 together provide a base station network (communicating via the CN 11) that provides radio access support for the wireless device 100. The wireless device 100 may be any sort of equipment, typically mobile but not necessarily so, that provides both UMTS and non-UMTS support. The wireless device 100 (hereinafter termed the UE 100) may include input/output (I/O) hardware 110, a wireless transceiver 120 and memory 140 that are all connected to and under the control of a central processing unit (CPU) 130 in a manner familiar to those of regular skill in the art. The I/O hardware 110 may include, for example, both a display and speaker for output, and a keypad and microphone for input. The wireless transceiver 120 enables the UE 100 to send and receive wireless signals. The CPU 130 controls the functionality of the UE 100 according to program code 149 contained within the memory 140 and executable by the CPU 130. In most aspects the UE 100 is identical to that of the prior art, but for modifications made to the program code 149 to implement the present invention method. How to effect such changes to the program code 149 should be clear to one of ordinary skill in the art after reading the following detailed description of the present invention method. Similarly, within the base station network, the t-RNC 10, the CN 11 and the BSS 20 are nearly identical to their prior art counterparts, but for modifications to implement the present invention method. As with the UE 100, respective program code is used to implement the functionality of the t-RNC 20, CN 11 and BSS 20. Hence, modifications to such program code can be made to provide the present invention method, and should be straightforward to one of reasonable skill in the art.

Because the UE 100 is a dual-system device, the program code 149 will support both a GSM stack (for communications with the non-UMTS GSM system, as indicated by BSS 20) and a UMTS stack (for communications with the UTRAN, as indicated by the t-RNC 10). It is the RRC layer 142 that is responsible for radio resource management by communicating with the UTRAN and GSM BSS. Relative to the RRC layer 142, there is an upper layer 143 and a lower layer 141. The lower layer 141 may include, for example, a radio link control (RLC) layer. The upper layer 143 may include a mobility management/GPRS mobility management (MM/GMM) layer 143m.

Figure 2:
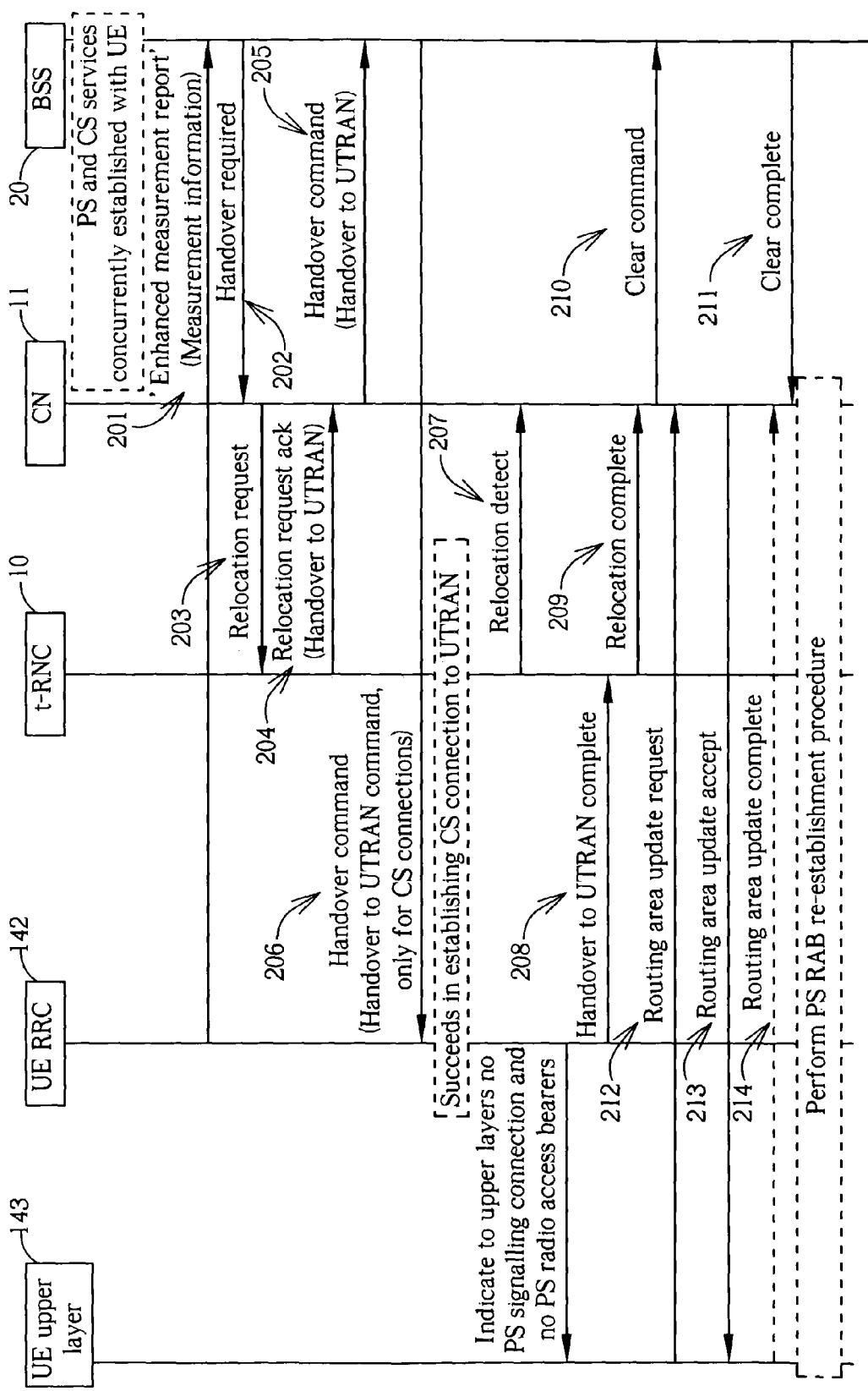
FIG. 2 is a message sequence chart for performing the present invention handover to UTRAN procedure.

Please refer to FIG. 2 with reference to FIG. 1. FIG. 2 is a message sequence chart for performing the present invention method. Initially, the UE 100 has established both PS and CS connections with the GSM system via the BSS 20. While connected to the BSS 20, the RRC layer 142 sends signal measurement information to the BSS 20 by way of an "Enhanced measurement report" 201. This measurement information includes measurement data for the t-RNC 10, and results in the BSS 20 determining that the UE 100 should be handed over to the t-RNC 10. The BSS 20 consequently informs the CN 11 of this fact by way of a Handover Required message 202. The CN 11, in turn, correspondingly notifies the t-RNC 10 by way of a relocation request message 203. The t-RNC 10 responds to the CN 11 with a Relocation request ack 204, which contains a Handover to UTRAN command for the UE 100. The CN 11 issues a Handover Command 205 to the BSS 20, which contains the Handover to UTRAN command for the UE 100. The BSS 20 then sends a Handover command 206 to the UE 100, which contains the Handover to UTRAN command, and which is forwarded to the RRC 142. Up to this point, the handover procedure is nearly identical to that of the prior art, but for one important difference: the Handover to UTRAN command that is provided to the UE RRC layer 142 by way of the BSS 20 contains only the information needed to handover the CS connection or connections. The Handover to UTRAN command embedded within the Handover command 206 does not contain information needed to handover the PS connection or connections. Consequently, despite the fact that at the time the Handover command 206 is issued to the UE 100 the UE 100 has both CS and PS connections established with the BSS 20, only the CS connections are handed over to the t-RNC 10. The purpose of this is to keep the Handover command 206 as small as possible so as to avoid excessive segmentation of the Handover command 206 that may result in degradation of the handover procedure. It is preferable to handover CS connections over PS connections as PS connections can generally tolerate brief interruptions of service, whereas this is typically not the case for CS connections.

When generating the Relocation request ack 204, the t-RNC 10 may build the embedded Handover to UTRAN command so that only CS connection information is provided, deliberately leaving out information needed to handover any PS connections. This deliberately incomplete Handover to UTRAN command is then sent to the BSS 20 via the CN 11, and thence on to the UE RRC 142 via the Handover command 206. Alternatively, the t-RNC 10 may include a complete Handover to UTRAN command in the Relocation request ack 204, including information for both PS and CS connections. The CN 11, however, may then strip the Handover to UTRAN command of the PS information, and in the Handover Command 205 include only the information needed for handing over CS connections in the Handover to UTRAN command. This stripped Handover to UTRAN command would then be forwarded to the UE RRC 142 via the BSS 20. Finally, it may be the BSS 20 itself that generates an incomplete Handover to UTRAN command in the Handover command 206, insuring that the Handover command 206 contains only enough information to enable the UE 100 to handover the CS connections to the t-RNC 10.

Upon receiving the Handover to UTRAN command, the RRC layer 142 must parse the Handover to UTRAN command to determine what connections are being handed over. This parsing is described later. However, as the Handover to UTRAN command contains only information need to hand over the CS connections, the RRC layer 142 determines that only CS connections are being handed over, and behaves accordingly. The UE 100 thus succeeds in establishing a CS connection (or connections) with the t-RNC 10 to re-establish CS services. This is detected by the t-RNC 10, which notifies the CN 11 with a Relocation detect message 207. At this time as well, the RRC layer 142 informs the upper layer 143 (i.e., the MM/GMM layer 143*m*) that there are no PS signaling connections and no PS radio access bearers (RABs) Not only does this enable the upper layer 143 to know that the PS services have not been handed over, but it also enables the upper layer 143 to know that the UE 100 is now camped on a UMTS system rather than the non-UMTS system. This is useful information, as the behavior of the MM/GMM layer 143*m* may change depending upon the type of network upon which the UE 100 is camped.

The RRC 142 sends a Handover to UTRAN complete message 208 to the t-RNC 10 (which establishes the RRC signaling connection), completing the Handover to UTRAN procedure between the UE 100 and the t-RNC 10. The t-RNC 10 correspondingly informs the CN 11 with a Relocation complete message 209, and the CN 11 responds by sending a Clear Command 210 to the BSS 20. The Clear Command 210 is responded to with a Clear Complete message 211. In response to learning that the UE 100 is now camped on the UTRAN, the MM/GMM layer 143*m* initiates a routing area update procedure by sending a Routing Area Update Request 212 to the CN 11. The purpose of the routing area update procedure is to change from the old 2G-SGSN to the new 3G-SGSN. The CN 11 performs various procedures, which culminate in the sending of a Routing Area Update Accept message 213 to the MM/GMM 143, and whichresponds with a Routing Area Update Complete message 214. Thereafter, the UE 100 can work with the UTRAN to re-establish the PS services. It should be noted that the sequencing of events in the above is preferred, but may be changed. For example, the routing area update procedure may be performed before, or concurrently with, the sending of the Handover to UTRAN complete message 208. Other sequences may also possibly be changed. However, re-establishment of PS services is preferably done after the routing area update procedure.

Figure 3:
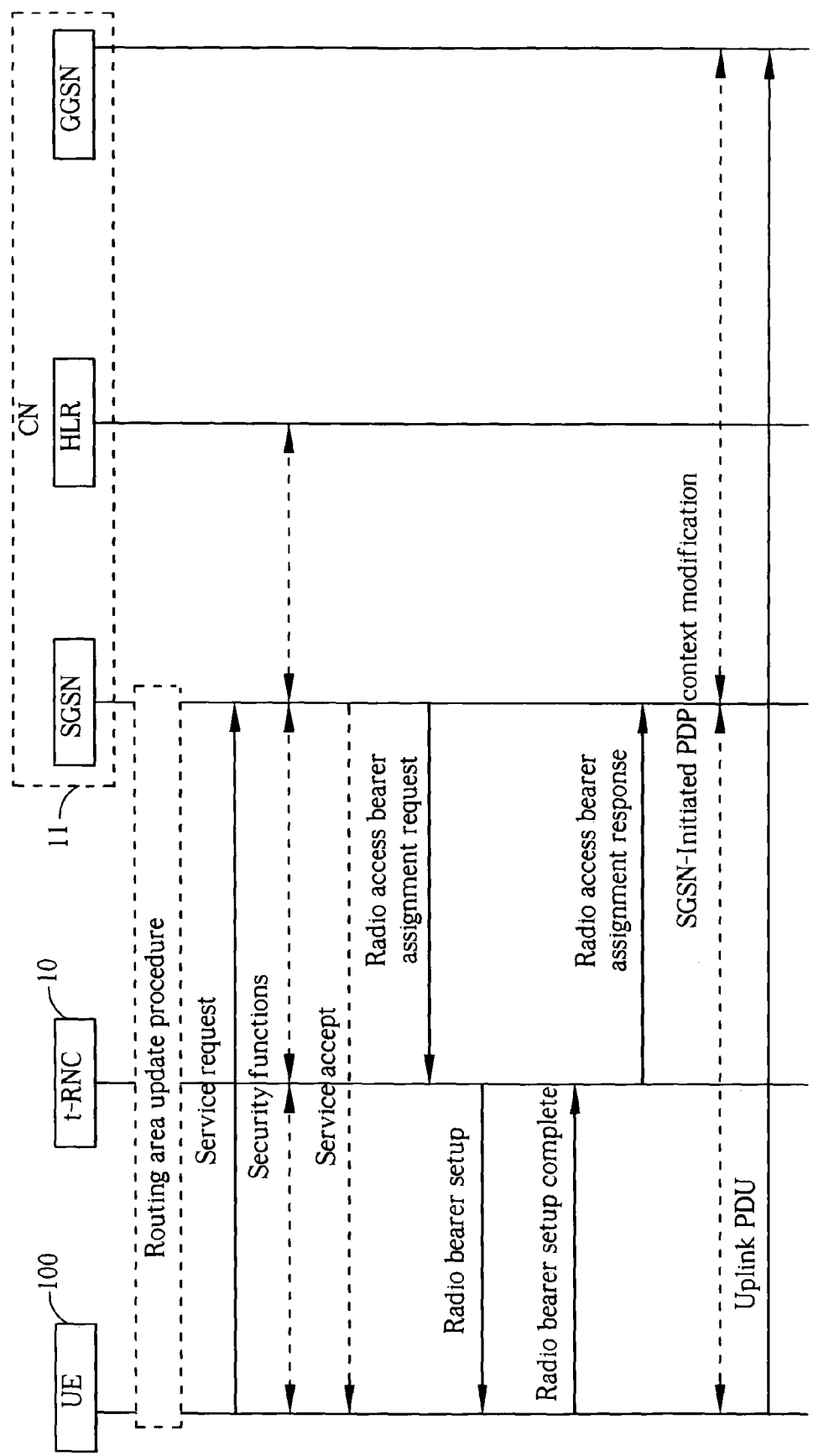
FIG. 3 is a message sequence chart for performing a first embodiment packet switched (PS) radio access bearer (RAB) re-establishment procedure to re-establish PS services.

There are two ways to perform the PS RAB re-establishment procedure. For the first, it is the UE 100 that initiates the PS RAB re-establishment procedure. For the second, it is the UTRAN (by way of the t-RNC 10) that initiates the PS RAB re-establishment procedure. Please refer to FIG. 3. FIG. 3 is a message sequence chart for performing a first embodiment PS RAB re-establishment procedure to re-establish PS services. In this first embodiment, it is the UE 100 that initiates the PS RAB re-establishment procedure. After the routing area update procedure, the MM/GMM 143*m* of the UE 100 sends a Service Request message to the SGSN. This is in response to learning that PS services are no longer available after the handover to UTRAN procedure. If the PS signaling connection established during the routing area update procedure is not released, then the SGSN responds with a Service Accept message to the UE 100, and so informs the t-RNC 10 with a Radio Access Bearer Assignment Request. If the PS signaling connection established during the routing area update procedure is released, then the SGSN performs various security functions to authenticate the UE 100. After the above, the t-RNC 10 sends a Radio Bearer Setup message to the UE 100, which indicates to the UE 100 the new Radio Bearer Identity established and the corresponding RAB ID. The UE 100 responds with a Radio Bearer Setup Complete message, and at this point, as far as the UE 100 is concerned, the PS RAB re-establishment procedure is complete and PS services are restored to the user of the UE 100. The t-RNC 10 responds by sending a Radio Access Bearer Assignment Response message to the SGSN. For each RAB re-established with a modified QoS profile, the SGSN may optionally initiate a PDP Context Modification procedure to inform the UE 100 and the GGSN of the new negotiated QoS profile for the corresponding PDP context. The UE 100 can then send or receive an uplink protocol data unit (PDU).

Figure 4:
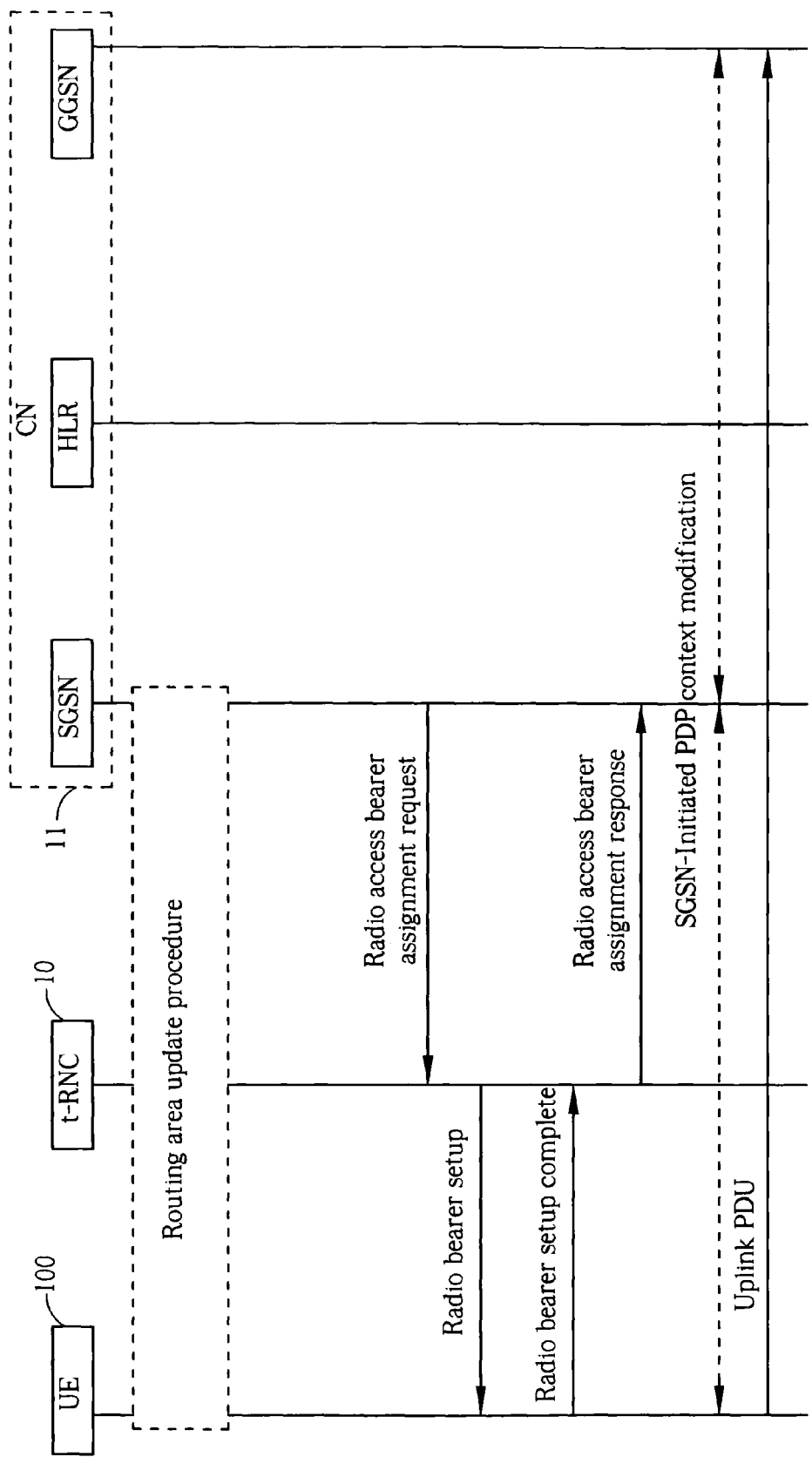
FIG. 4 is a message sequence chart for performing a second embodiment PS RAB re-establishment procedure to re-establish PS services.

Please refer to FIG. 4. FIG. 4 is a message sequence chart for performing a second embodiment PS RAB re-establishment procedure to re-establish PS services. In this second embodiment, it is the UTRAN that initiates the PS RAB re-establishment procedure. In this case, it should be noted that the PS signaling connection established during the routing area update procedure is not released. In response to learning that PS services are no longer available after the handover to UTRAN procedure, the SGSN sends a Radio Access Bearer Assignment Request to the t-RNC 10 to re-establish RABs for every appropriately activated PDP context. In response, the t-RNC 10 sends a Radio Bearer Setup message to the UE 100, which indicates to the UE 100 the new radio bearer identity established, and the corresponding RAB ID. The UE 100 responds with a Radio Bearer Setup Complete message, and at this point, as far as the UE 100 is concerned, the PS RAB re-establishment procedure is complete and PS services are restored to the user of the UE 100. The t-RNC 10 responds by sending a Radio Access Bearer Assignment Response message to the SGSN. For each RAB re-established with a modified QoS profile, the SGSN may optionally initiate a PDP Context Modification procedure to inform the UE 100 and the GGSN of the new negotiated QoS profile for the corresponding PDP context. The UE 100 can then send an uplink protocol data unit (PDU).

Figure 5:
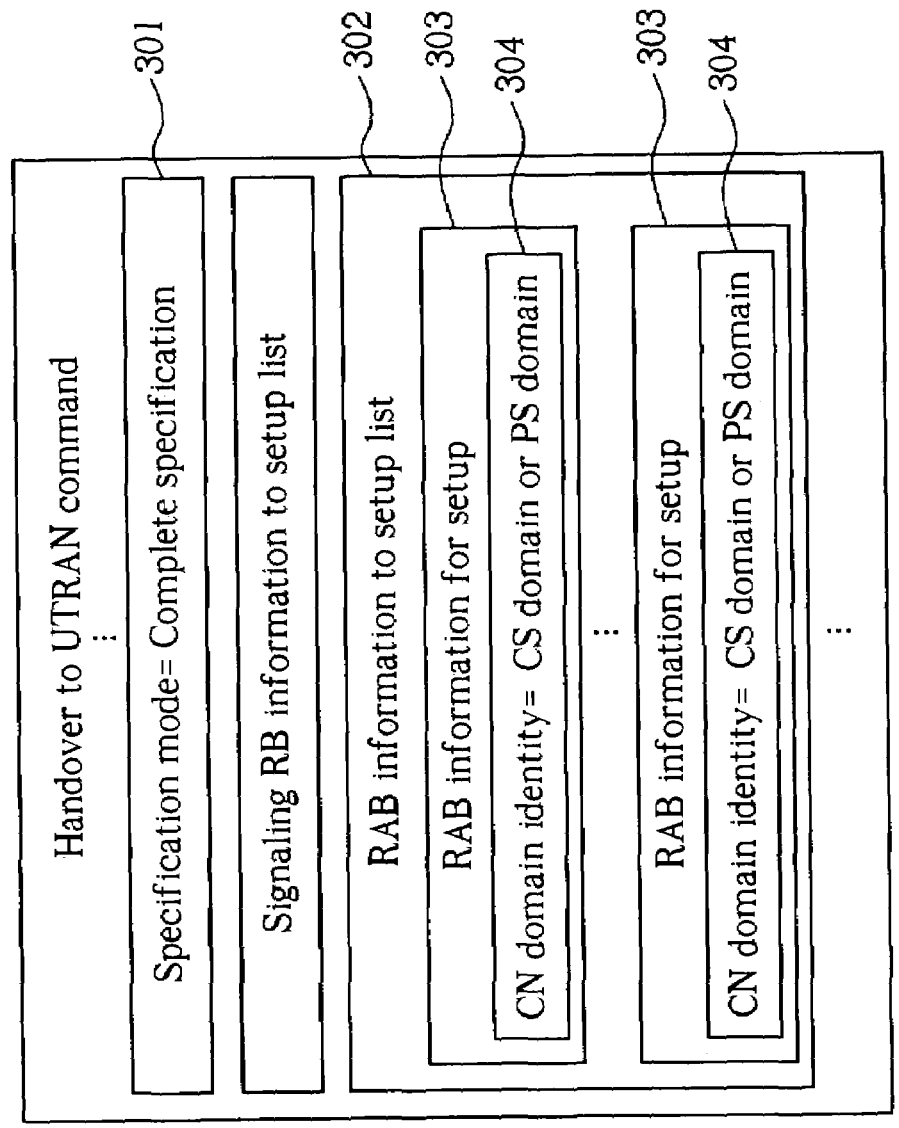
FIG. 5 is a simplified block diagram of a Handover to UTRAN command that holds a complete specification of RABs that are being handed over.
Figure 6:
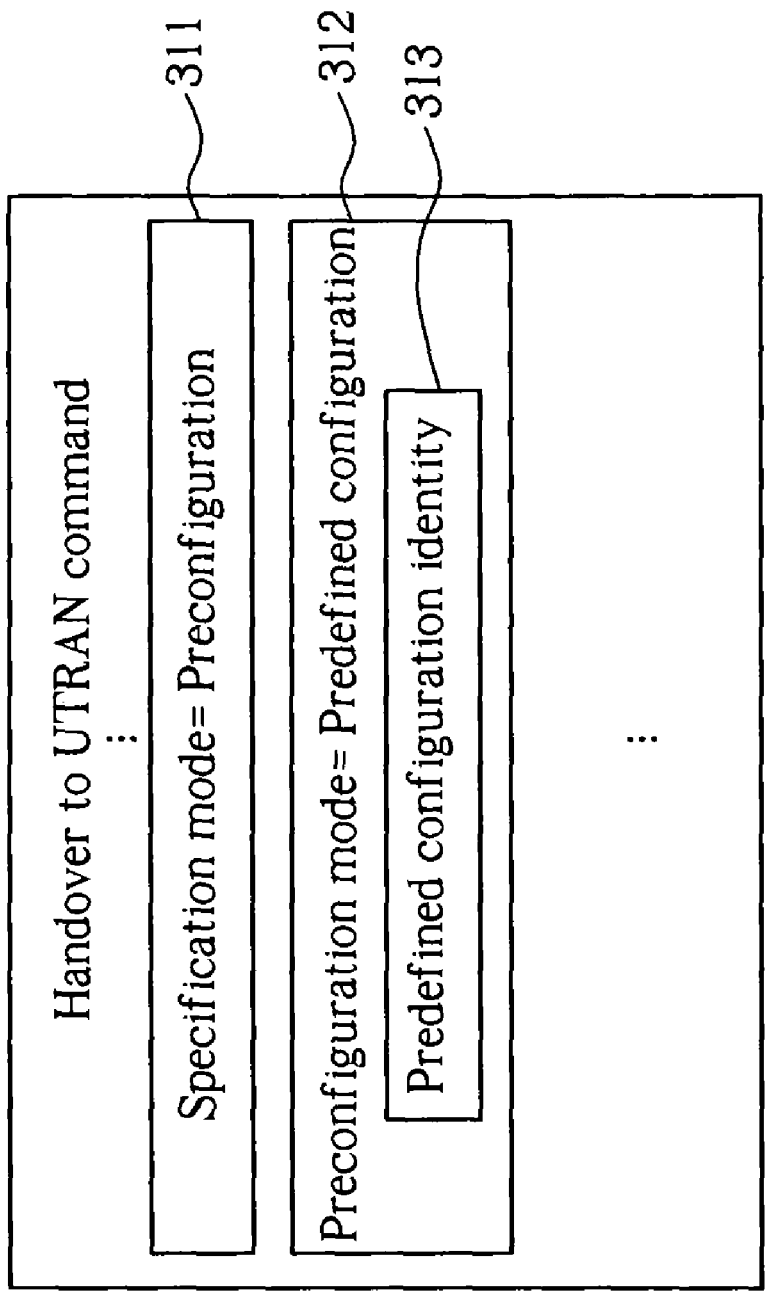
FIG. 6 is a simplified block diagram of a Handover to UTRAN command that utilizes predefined configurations to indicate which RABs are being handed over.
Figure 7:
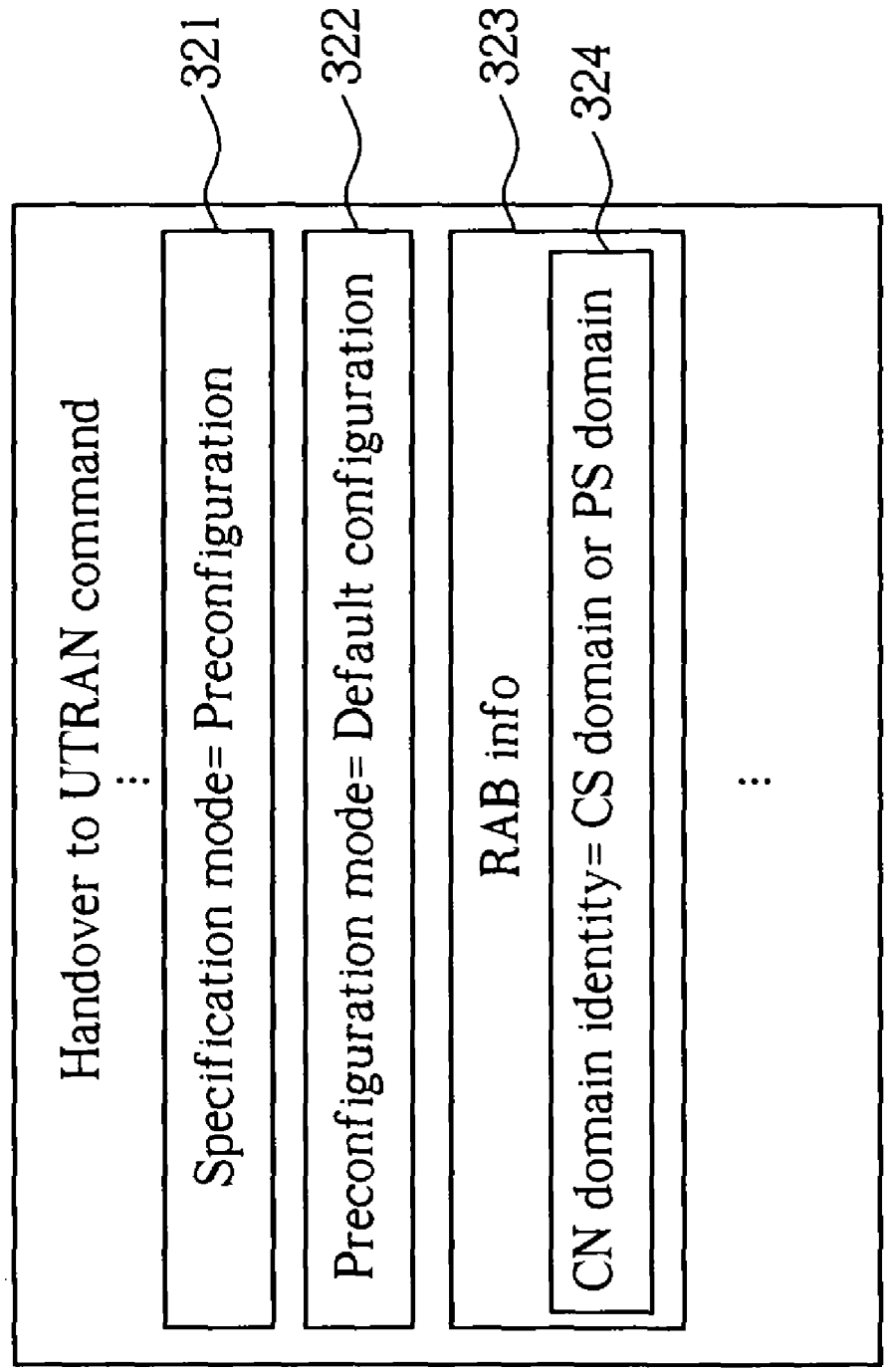
FIG. 7 is a simplified block diagram of a Handover to UTRAN command that utilizes the default configurations to indicate which RABs are being handed over.
Figure 8:
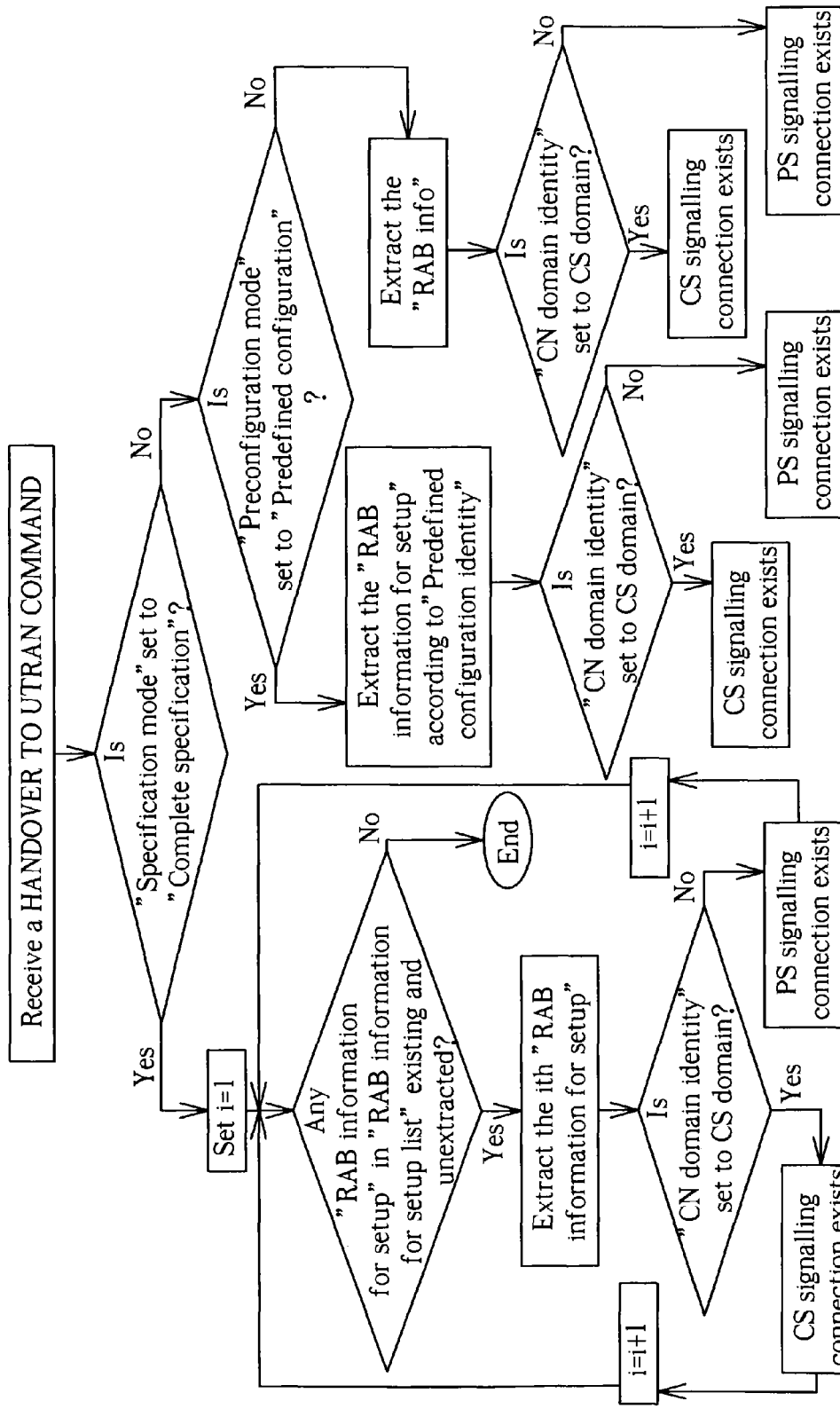
FIG. 8 is a flow chart of the present invention method for parsing a Handover to UTRAN command to determine what signaling connections are handed over during a Handover to UTRAN procedure.

The UE 100 must determine what signaling connections are handed over during the handover to UTRAN command so as to know what sort of procedure to use to transfer messages to the UTRAN (i.e., the t-RNC 10), and does so by parsing the Handover to UTRAN command. Please refer to FIGS. 5 to 8. FIG. 5 is a simplified block diagram of a Handover to UTRAN command that holds a complete specification of the RABs that are being handed over. FIG. 6 is a simplified block diagram of a Handover to UTRAN command that utilizes the predefined configurations to indicate which RABs are being handed over. FIG. 7 is a simplified block diagram of a Handover to UTRAN command that utilizes the default configurations to indicate which RABs are being handed over. FIG. 8 is a flow chart of the present invention method for parsing the Handover to UTRAN command to determine what signaling connections are handed over during the Handover to UTRAN procedure. It should be noted that FIGS. 5 to 7 show only those portions of the Handover to UTRAN command that are relevant to the present invention method. A complete description of the Handover to UTRAN command data structure can be found in 3GPP TS 25.331 clause 10.2.16a.

The format of the Handover to UTRAN command changes depending upon whether the complete specification, predefined configuration or default configuration is used. If, as shown in FIG. 5, a complete specification is used, then an information element (IE) Specification mode 301 will be set to a value "Complete specification". In this case, then, an IE RAB information to setup list 302 will exist, containing one or more IEs RAB information for setup 303. Each IE RAB information for setup 303 contains an IE CN domain identity 304. The IE CN domain identity 304 can have a value of either "CS domain" or "PS domain". Consequently, if the IE Specification mode 301 is "Complete specification", then each IE RAB information for setup 303 is individually extracted and the corresponding IE CN domain identity 304 is checked. If the IE CN domain identity 304 is "PS domain", then it is determined that a PS signaling connection exists. If the IE CN domain identity 304 is "CS domain", then it is determined that a CS signaling connection exists. Note, then, that it is possible to have both CS and PS signaling connections with a complete specification type Handover to UTRAN command.

As noted earlier, predefined configurations 147 are downloaded from the UTRAN and stored within the UE 100. With reference to FIG. 6, if the IE Specification mode 311 within the Handover to UTRAN command is set to "Preconfiguration", then an IE Preconfiguration mode 312 will exist. If the IE Preconfiguration mode 312 is set to "Predefined configuration", then the IE Preconfiguration mode 312 will hold an integer valued IE Predefined configuration identity 313. This IE Predefined configuration identity 313 indicates which of the predefined configurations 147 should be used, and is used as an index to extract an IE RAB information for setup 148. The extracted IE 148 holds an IE CN domain identity 148c that can be either "CS domain" or "PS domain". If the IE CN domain identity 148c is "PS domain", then it is determined that a PS signaling connection exists. If the IE CN domain identity 148c is "CS domain", then it is determined that a CS signaling connection exists.

With reference to FIG. 7, if the IE Specification mode 321 within the Handover to UTRAN command is set to "Preconfiguration", then the IE Preconfiguration mode 322 will exist. If the IE Preconfiguration mode 322 is set to "Default configuration", then an IE RAB info 323 will be present in the Handover to UTRAN command. The IE RAB info 323 has an IE CN domain identity that can be either "CS domain" or "PS domain". If the IE CN domain identity 324 is "PS domain", then it is determined that a PS signaling connection exists. If the IE CN domain identity 324 is "CS domain", then it is determined that a CS signaling connection exists.

In contrast to the prior art, the present invention does not include PS information in a Handover to UTRAN command when both PS and CS RABs are established with the non-UMTS network at the time of the handover procedure. This helps to ensure that CS services are handed over smoothly and in an uninterrupted manner. PS services are then restored after the CS services are handed over, and ideally after performing a routing area update procedure, as this ensures that packets are properly routed. Additionally, the present invention provides an explicit method that enables a wireless device to determine which services (CS, PS or both) are being handed over during a Handover to UTRAN procedure.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for performing an inter system handover to Universal Terrestrial Radio Access Network (UTRAN) procedure, the method comprising:
   a wireless device establishing simultaneous circuit switched (CS) and packet switched (PS) services with a first radio access technology (RAT) system;
   with the CS and PS services ongoing, the first RAT system transmitting a HANDOVER TO UTRAN COMMAND message to the wireless device to perform a handover to UTRAN procedure, the HANDOVER TO UTRAN COMMAND message excluding information used for handing over PS connections to the UTRAN so that the handover to UTRAN procedure hands over only CS connections;
   the wireless device receiving the HANDOVER TO UTRAN COMMAND message;
   the wireless device parsing the HANDOVER TO UTRAN COMMAND to determine what connections are handed over during the handover to UTRAN procedure, wherein parsing the HANDOVER TO UTRAN COMMAND to determine what connections are handed over during the handover to UTRAN procedure comprises:
   determining a CS connection is handed over if an information element (IE) "Specification mode" in the HANDOVER TO UTRAN COMMAND message is set to "Complete specification" and a core network (CN) domain identity of an IE "RAB information for setup" is a CS domain;
   determining a PS connection is handed over if the IE "Specification mode" in the HANDOVER TO UTRAN COMMAND message is set to "Complete specification" and the core CN domain identity of the IE "RAB information for setup" is a PS domain;
   determining a CS connection is handed over if the IE "Specification mode" in the HANDOVER TO UTRAN COMMAND message is set to "Preconfiguration", an IE "Preconfiguration mode" is set to "Predefined configuration", and the CN domain identity of the IE "RAB information for setup" identified by an IE "Predefined configuration identity" is the CS domain;
   determining a PS connection is handed over if the IE "Specification mode" in the HANDOVER TO UTRAN COMMAND message is set to "Preconfiguration", the IE "Preconfiguration mode" is set to "Predefined configuration", and the CN domain identity of the IE "RAB information for setup" identified by the IE "Predefined configuration identity" is the PS domain;
   determining a CS connection is handed over if the IE "Specification mode" in the HANDOVER TO UTRAN COMMAND message is set to "Preconfiguration", the IE "Preconfiguration mode" is set to "Default configuration", and a CN domain identity of an IE "RAB info" is the CS domain; and determining a PS signaling connection is handed over if the IE "Specification mode" in the HANDOVER TO UTRAN COMMAND message is set to "Preconfiguration", the IE "Preconfiguration mode" is set to "Default configuration", and the CN domain identity of the IE "RAB info" is the PS domain; and in response to the wireless device parsing the HANDOVER TO UTRAN COMMAND message and determining that only CS connections are handed over during the handover to UTRAN procedure, a radio resource control (RRC) layer within the wireless device informing an upper layer within the wireless device that no PS radio access bearers or no PS signaling connections are present.

2. The method of claim 1 wherein the RRC layer informs the upper layer that no PS radio access bearers or no PS signaling connections are present after successful completion of the handover to UTRAN procedure.

3. The method of claim 1 further comprising performing a routing area update procedure.

4. The method of claim 3 wherein in response to the RRC layer informing the upper layer that no PS radio access bearers or no PS signaling connections are present, the upper layer initiates the routing area update procedure.

5. The method of claim 3 further comprising the wireless device initiating re-establishment of radio access bearers in response to determining that only CS connections are handed over during the handover to UTRAN procedure.

6. The method of claim 5 wherein the re-establishment of radio access bearers is performed to re-establish PS services.

7. The method of claim 5 wherein the re-establishment of radio access bearers is performed by sending a SERVICE REQUEST message after completion of the routing area update procedure.

8. The method of claim 3 further comprising a network initiating re-establishment of radio access bearers in response to determining that only CS connections are handed over during the handover to UTRAN procedure.

9. The method of claim 8 wherein the re-establishment of radio access bearers is performed to re-establish PS services.

10. The method of claim 8 wherein the re-establishment of radio access bearers is performed by sending a RAB assignment request message after completion of the routing area update procedure.

11. A wireless device comprising a central processing unit (CPU) and memory, the memory containing program code executable by the CPU for performing the following steps:

receiving a HANDOVER TO UTRAN COMMAND message from a first RAT system to perform a handover to Universal Terrestrial Radio Access Network (UTRAN) procedure;

parsing the HANDOVER TO UTRAN COMMAND to determine what connections are handed over during the handover to UTRAN procedure, wherein the program code associated with parsing the HANDOVER TO UTRAN COMMAND to determine what connections are handed over during the handover to UTRAN procedure is capable of performing the following steps:

determining a CS signaling connection is handed over if an information element (IE) "Specification mode" in the HANDOVER TO UTRAN COMMAND message is set to "Complete specification" and a core network (CN) domain identity of an IE "RAB information for setup" is a CS domain;

determining a PS signaling connection is handed over if the IE "Specification mode" in the HANDOVER TO UTRAN COMMAND message is set to "Complete specification" and the core CN domain identity of the IE "RAB information for setup" is a PS domain;

determining a CS signaling connection is handed over if the IE "Specification mode" in the HANDOVER TO UTRAN COMMAND message is set to "Preconfiguration", an IE "Preconfiguration mode" is set to "Predefined configuration", and the CN domain identity of the IE "RAB information for setup" identified by an IE "Predefined configuration identity" is the CS domain;

determining a PS signaling connection is handed over if the IE "Specification mode" in the HANDOVER TO UTRAN COMMAND message is set to "Preconfiguration", the IE "Preconfiguration mode" is set to "Predefined configuration", and the CN domain identity of the IE "RAB information for setup" identified by the IE "Predefined configuration identity" is the PS domain;

determining a CS signaling connection is handed over if the IE "Specification mode" in the HANDOVER TO UTRAN COMMAND message is set to "Preconfiguration", the IE "Preconfiguration mode" is set to "Default configuration", and a CN domain identity of an IE "RAB info" is the CS domain; and determining a PS signaling connection is handed over if the IE "Specification mode" in the HANDOVER TO UTRAN COMMAND message is set to "Preconfiguration", the IE "Preconfiguration mode" is set to "Default configuration", and the CN domain identity of the IE "RAB info" is the PS domain; and in response to parsing the HANDOVER TO UTRAN COMMAND message and determining that only circuit switched (CS) connections are handed over during the handover to UTRAN procedure when both CS and packet switched (PS) services are ongoing in the first RAT system upon reception of the HANDOVER TO UTRAN COMMAND message, causing a radio resource control (RRC) layer within the wireless device to inform an upper layer within the wireless device that no PS radio access bearers or no PS signaling connections are present.

12. The wireless device of claim 11 wherein the program code further causes the RRC layer to inform the upper layer that no PS radio access bearers or no PS signaling connections are present after successful completion of the handover to UTRAN procedure when both CS and PS services are ongoing in the first RAT system upon reception of the HANDOVER TO UTRAN COMMAND message.

13. The wireless device of claim 11 wherein the program code further causes the upper layer to perform a routing area update procedure in response to the RRC layer informing the upper layer that no PS radio access bearers or no PS signaling connections are present when both CS and PS services are ongoing in the first RAT system upon reception of the HANDOVER TO UTRAN COMMAND message.

14. The wireless device of claim 13 wherein the program code further causes the wireless device to initiate re-establishment of radio access bearers in response to determining that only CS connections are handed over during the handover to UTRAN procedure when both CS and PS services are ongoing in the first RAT system upon reception of the HANDOVER TO UTRAN COMMAND message.

15. The wireless device of claim 14 wherein the re-establishment of radio access bearers is performed to re-establish PS services.

16. The wireless device of claim 14 wherein the re-establishment of radio access bearers is performed by sending a SERVICE REQUEST message after completion of the routing area update procedure.

17. A wireless system comprising:
a base station network comprising a Universal Mobile Telecommunications System (UMTS) network and a non-UMTS network; and
a user equipment (UE) capable of establishing simultaneous packet switched (PS) and circuit switched (CS) connections with the base station network;
wherein the base station network further comprises:
means for generating and transmitting a HANDOVER TO UTRAN COMMAND message to the UE when CS and PS services are being simultaneously supported by the UE for performing a handover to UTRAN procedure to hand over the UE to the UMTS network from the non-UMTS network, the HANDOVER TO UTRAN COMMAND message excluding information used for handing over PS connections to the UMTS network so that the handover procedure hands over only CS connections;
wherein the UE further comprises:
means for parsing the HANDOVER TO UTRAN COMMAND message to determine what connections are handed over during the handover to UTRAN procedure, wherein the means for parsing the HANDOVER TO UTRAN COMMAND message is capable of performing the following steps:
determining a CS signaling connection is handed over if an information element (IE) "Specification mode" in the HANDOVER TO UTRAN COMMAND message is set to "Complete specification" and a core network (CN) domain identity of an IE "RAB information for setup" is a CS domain;
determining a PS signaling connection is handed over if the IE "Specification mode" in the HANDOVER TO UTRAN COMMAND message is set to "Complete specification" and the core CN domain identity of the IE "RAB information for setup" is a PS domain;
determining a CS signaling connection is handed over if the IE "Specification mode" in the HANDOVER TO UTRAN COMMAND message is set to "Pre-configuration", an IE "Preconfiguration mode" is set to "Predefined configuration", and the CN domain identity of the IE "RAB information for setup" identified by an IE "Predefined configuration identity" is the CS domain;
determining a PS signaling connection is handed over if the IE "Specification mode" in the HANDOVER TO UTRAN COMMAND message is set to "Preconfiguration", the IE "Preconfiguration mode" is set to "Predefined configuration", and the CN domain identity of the IE "RAB information for setup" identified by the IE "Predefined configuration identity" is the PS domain;
determining a CS signaling connection is handed over if the IE "Specification mode" in the HANDOVER TO UTRAN COMMAND message is set to "Preconfiguration", the IE "Preconfiguration mode" is set to "Default configuration", and a CN domain identity of an IE "RAB info" is the CS domain; and
determining a PS signaling connection is handed over if the IE "Specification mode" in the HANDOVER TO UTRAN COMMAND message is set to "Preconfiguration", the IE "Preconfiguration mode" is set to "Default configuration", and the CN domain identity of the IE "RAB info" is the PS domain; and
means for causing a radio resource control (RRC) layer within the UE to inform an upper layer within the UE that no PS radio access bearers or no PS signaling connections are present in response to parsing the HANDOVER TO UTRAN COMMAND message and determining that only CS connections are handed over during the handover to UTRAN procedure when both CS and PS services are being simultaneously supported by the UE.

18. The wireless system of claim 17 wherein the UE further comprises means for causing the upper layer to perform a routing area update procedure in response to the RRC layer informing the upper layer that no PS radio access bearers or no PS signaling connections are present when both CS and PS services are being simultaneously supported by the UE.

19. The wireless system of claim 18 wherein the UE further comprises means for causing the UE to initiate re-establishment of radio access bearers in response to determining that only CS connections are handed over during the handover to UTRAN procedure when both CS and PS services are being simultaneously supported by the UE.

20. The wireless system of claim 19 wherein the re-establishment of radio access bearers is performed to re-establish PS services.

21. The wireless system of claim 19 wherein the re-establishment of radio access bearers is performed by sending a SERVICE REQUEST message after completion of the routing area update procedure.

22. The wireless system of claim 17 wherein the base station network further comprises means for initiating re-establishment of radio access bearers in response to determining that only CS connections are handed over during the handover to UTRAN procedure.

23. The wireless system of claim 22 wherein the re-establishment of radio access bearers is performed to re-establish PS services.

24. The wireless system of claim 22 wherein the re-establishment of radio access bearers is performed by sending a RAB assignment request message after completion of an associated routing area update procedure.

* * * * *